United States Patent
Zhu

(10) Patent No.: US 11,106,212 B2
(45) Date of Patent: Aug. 31, 2021

(54) PATH PLANNING FOR COMPLEX SCENES WITH SELF-ADJUSTING PATH LENGTH FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 320 days.

(21) Appl. No.: 16/365,537

(22) Filed: Mar. 26, 2019

(65) Prior Publication Data

US 2020/0310451 A1 Oct. 1, 2020

(51) Int. Cl.
*G05D 1/02* (2020.01)
*G05D 1/00* (2006.01)

(52) U.S. Cl.
CPC ......... *G05D 1/0223* (2013.01); *G05D 1/0088* (2013.01); *G05D 2201/0213* (2013.01)

(58) Field of Classification Search
CPC ............. G05D 1/02237; G05D 1/0088; G05D 2201/0213
See application file for complete search history.

(56) References Cited

U.S. PATENT DOCUMENTS

| | | | |
|---|---|---|---|
| 5,612,883 A * | 3/1997 | Shaffer | G05D 1/0242 701/300 |
| 9,120,485 B1 * | 9/2015 | Dolgov | B60W 30/10 |
| 9,645,577 B1 * | 5/2017 | Frazzoli | B60W 30/18163 |
| 10,858,012 B2 * | 12/2020 | Maura | B60W 30/18163 |
| 2018/0043886 A1 * | 2/2018 | Keller | B60W 10/20 |
| 2019/0196485 A1 * | 6/2019 | Li | G08G 1/00 |
| 2019/0220016 A1 * | 7/2019 | Phillips | G01C 21/20 |
| 2019/0315357 A1 * | 10/2019 | Zhang | G05D 1/0238 |

* cited by examiner

*Primary Examiner* — Ramsey Refai
(74) *Attorney, Agent, or Firm* — Womble Bond Dickinson (US) LLP

(57) ABSTRACT

According to some embodiments, an ADV includes a method to plan a path trajectory. The method initializes a path length to a initial path length and performs a path planning operation using the initial path length. The method determines if the path planning operation successfully generates the path trajectory. If the path trajectory fails to be successfully generated, the method determines a reason for the failure. If the path trajectory fails to be generated for reasons other than an obstacle blocking the vehicle, the method defaults the path trajectory to a backup path. If the path trajectory fails to be generated due to an obstacle blocking the vehicle, the method reduces the path length by an incremental amount to generate a reduced path length. The method performs the path planning operation using the reduced path length until a path trajectory is successfully generated or until a stop condition is reached.

20 Claims, 11 Drawing Sheets

PATH PLANNING FOR COMPLEX SCENES WITH SELF-ADJUSTING PATH LENGTH FOR AUTONOMOUS DRIVING VEHICLES

TECHNICAL FIELD

Embodiments of the present disclosure relate generally to operating autonomous vehicles. More particularly, embodiments of the disclosure relate to path planning for complex scenes by adjusting the path length for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Motion planning and control may include path planning and speed planning. Conventional path planning operations estimate the difficulty of completing a plurality of trajectories based on scenes of obstacles, traffic condition, road boundaries, etc., perceived by the vehicle to determine an optimized path trajectory that satisfies a set of path planning criteria for the vehicle. However, some complex scenes may prevent the vehicle from successfully determining the path trajectory or may cause the vehicle to select a path trajectory that is not optimized.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an ADV includes a method to plan a path trajectory. The method initializes a path length to a default path length. The method performs a path planning operation using the default path length. The method determines if the path planning operation successfully generates the path trajectory. If the path trajectory fails to be successfully generated, the method determines a reason for the failure. If the path trajectory fails to be generated for reasons other than due to an obstacle blocking the vehicle, the method defaults the path trajectory to a backup path. If the path trajectory fails to be generated due to an obstacle blocking the vehicle, the method reduces the path length by an incremental amount to generate a reduced path length. The method performs the path planning operation using the reduced path length until a path trajectory is successfully generated or until a stop condition is reached.

According to one embodiment, a path planning operation is performed to generate a path trajectory based on a path length as an initial path length. The path trajectory falls back to a backup path trajectory in response to determining that the path trajectory fails to be generated due to a non-blocking reason. In response to determining that the path trajectory is blocked by one or more obstacles, the path length is reduced by a predetermined incremental length to generate a reduced path length and the path planning operation is repeatedly performed based on the reduced path length. The path planning operation based on the reduced path length fails again, the path length will be reduced again the path planning operation is iteratively performed until a predetermined condition is satisfied, such as, for example, the path is successfully generated, fails due to a non-blocking reason, or the path length is less than a predetermined minimum length.

Figure 1:
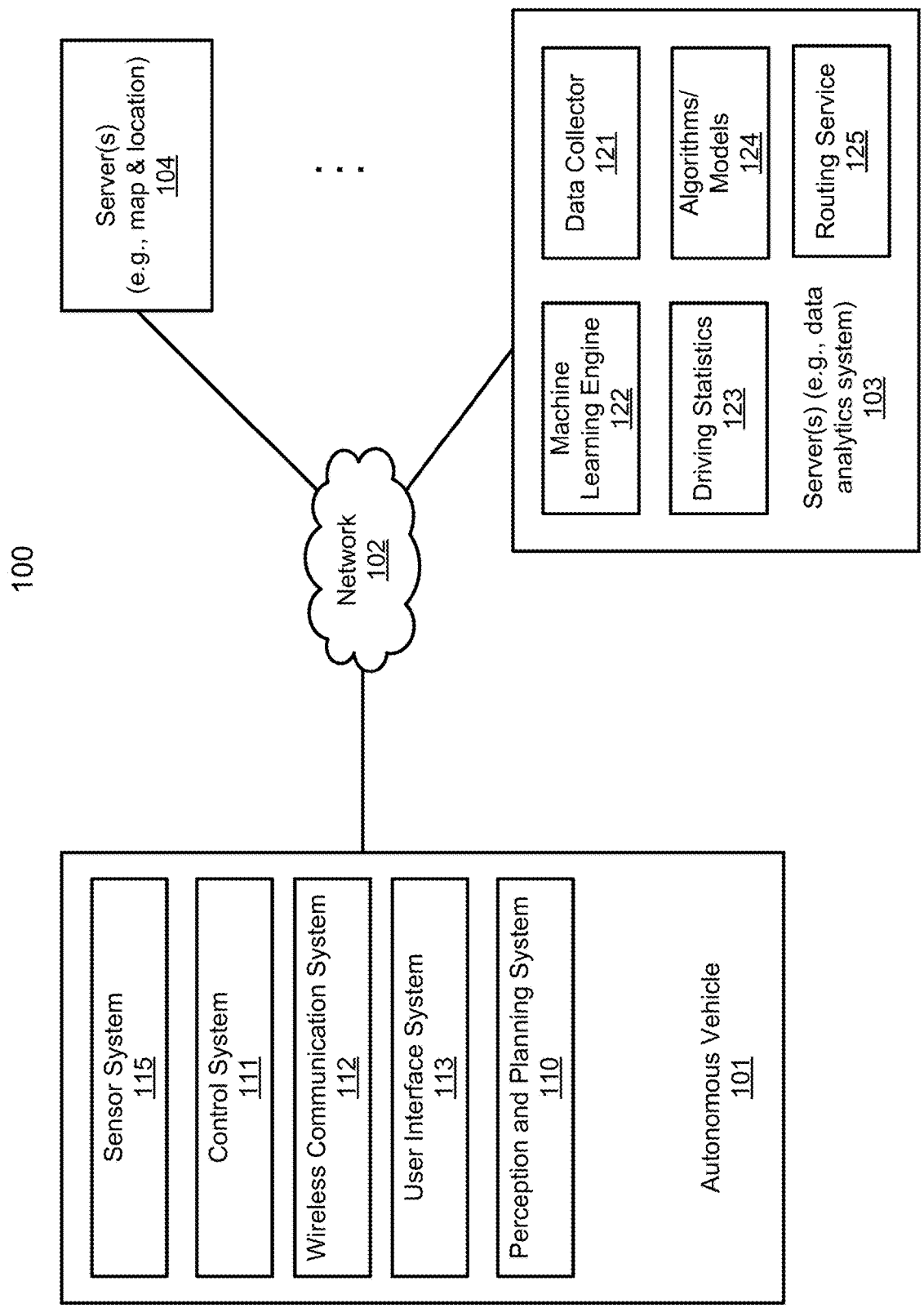
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
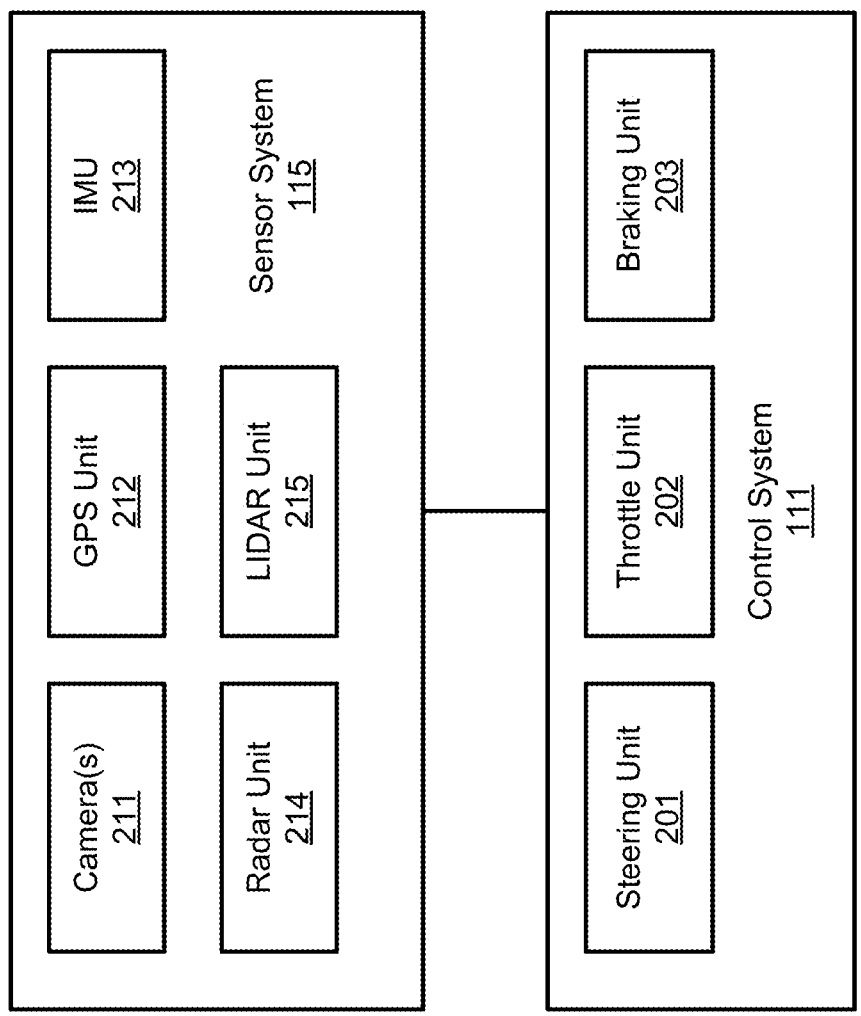
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, for example, algorithms 124 may include an optimization method to optimize path planning and speed planning. The path planning optimization method may generate a path trajectory for a path length projecting from a current position of the vehicle starting from a default path length. If the path trajectory could not be generated using the default path length due the vehicle being blocked by obstacles along the default path length, the path planning optimization method may successively decrement the path length until a path trajectory using the reduced path length is successfully generated, the path trajectory could not be generated due to reasons other than the vehicle being blocked by obstacles, or the path length is reduced to below a minimum length. The algorithms 124 including the path planning optimization method can be uploaded onto the autonomous driving vehicle to be used to generate path trajectory for the vehicle in real time.

Figure 3A:
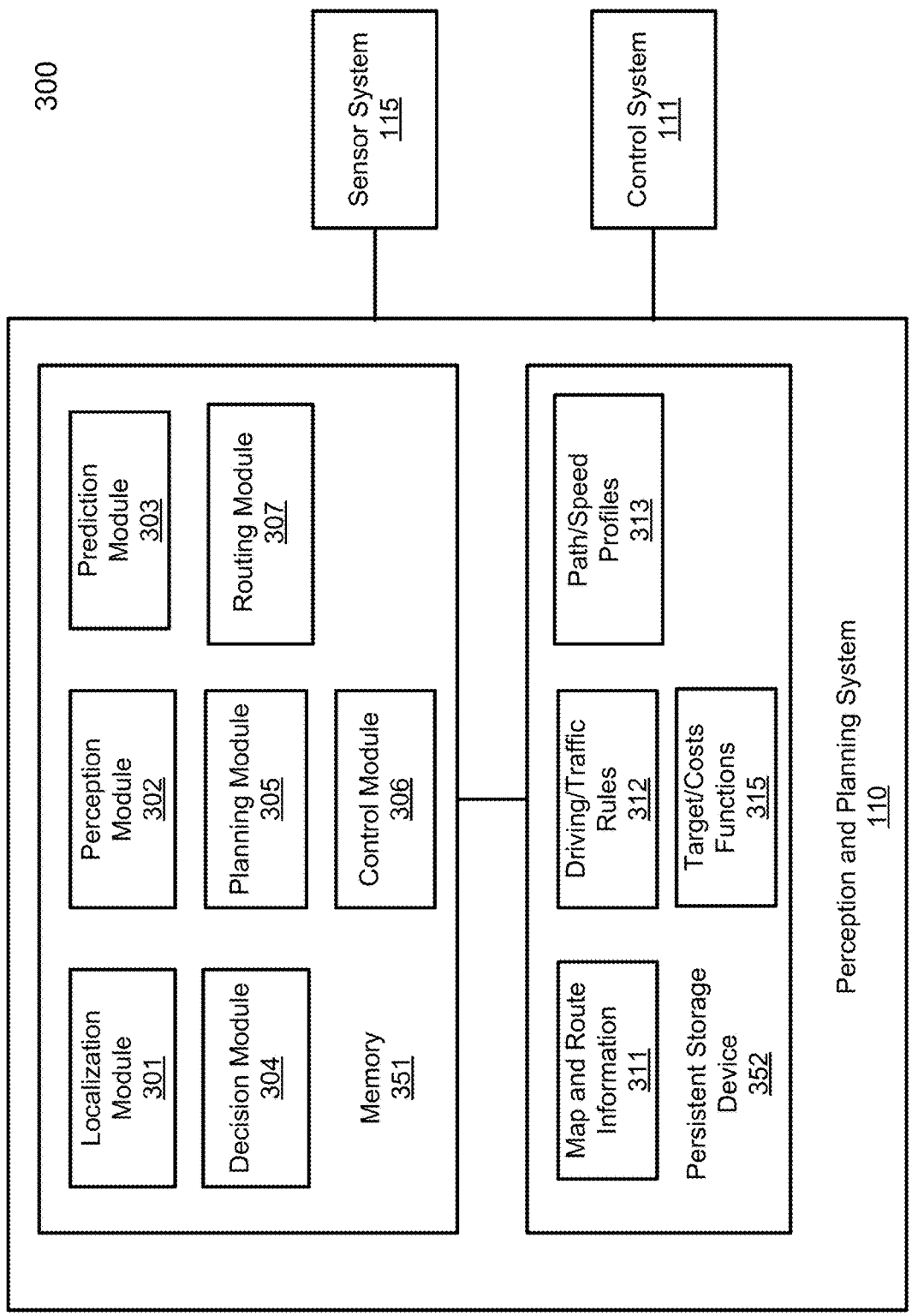
FIGS. 3A-3B are block diagrams illustrating examples of a perception and planning system used by an autonomous vehicle according to some embodiments.
Figure 3B:
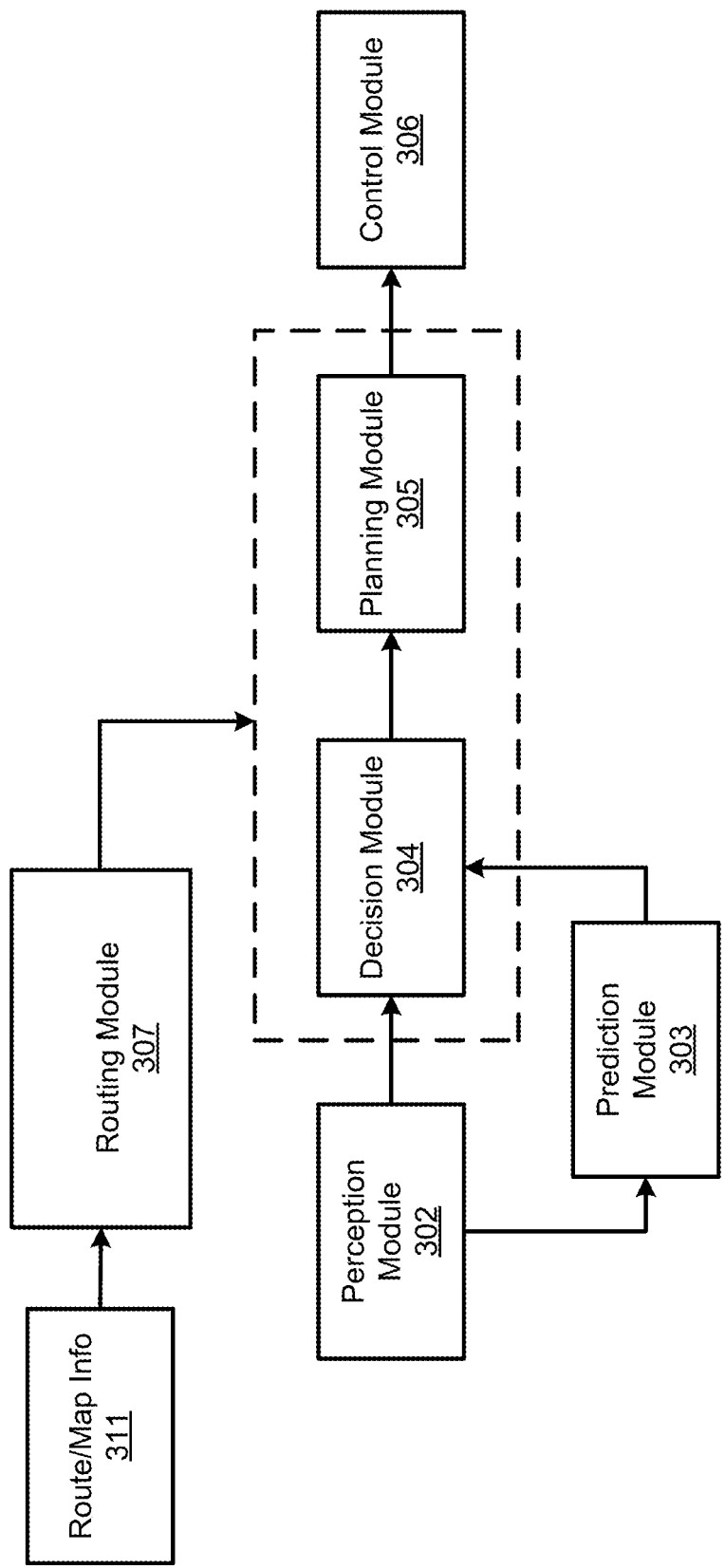

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

In one embodiment, decision module 304 generates a rough path profile based on a reference line provided by routing module 307 and based on obstacles and/or traffic information perceived by the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP).

In one embodiment, planning module 305 recalculates the rough speed profile using quadratic programming (QP) to optimize a speed cost function (as part of cost functions 315). Similar speed barrier constraints can be added to forbid the QP solver to search for some forbidden speeds.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
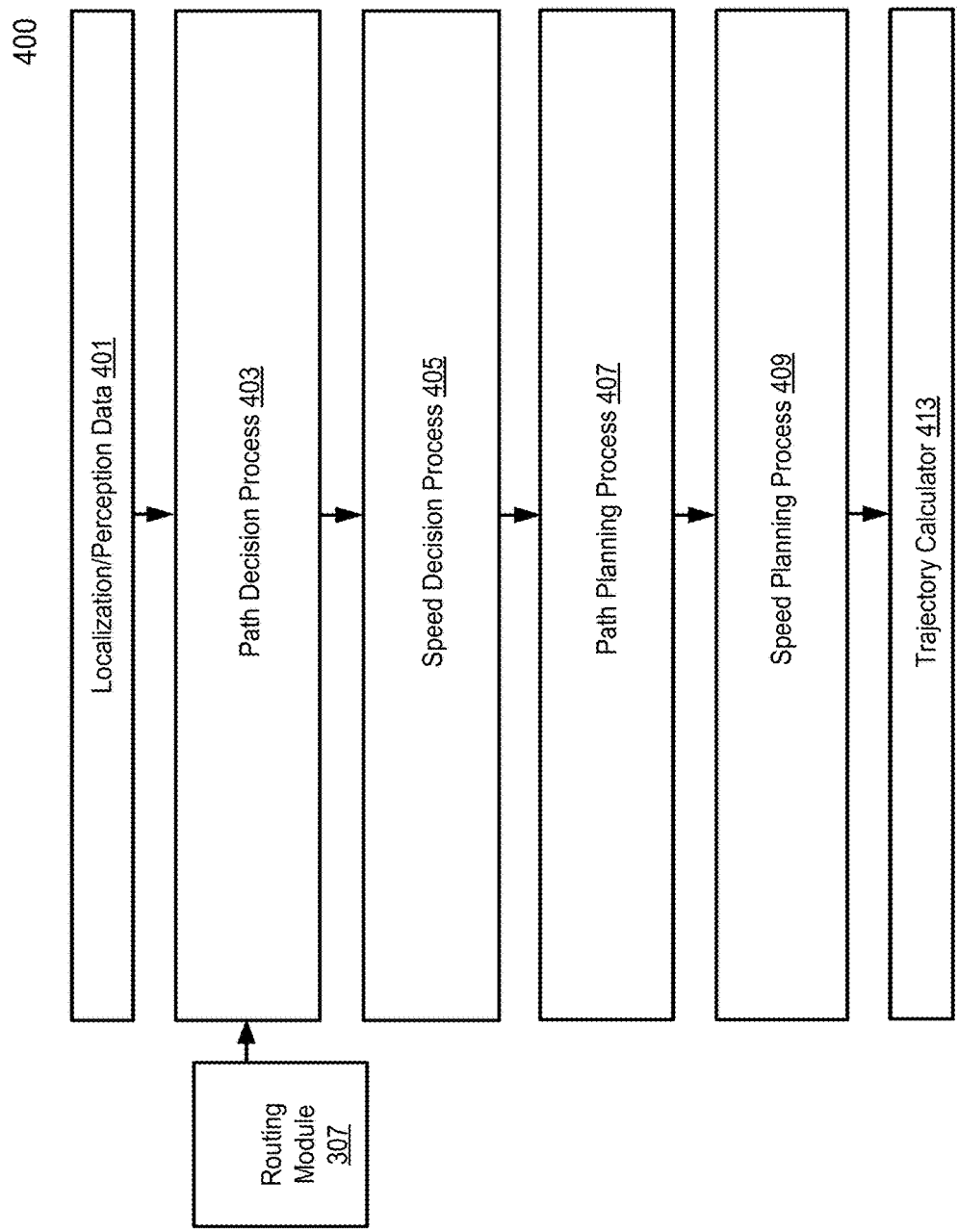
FIG. 4 is a block diagram illustrating an example of a decision and a planning process according to one embodiment.
Figure 5:
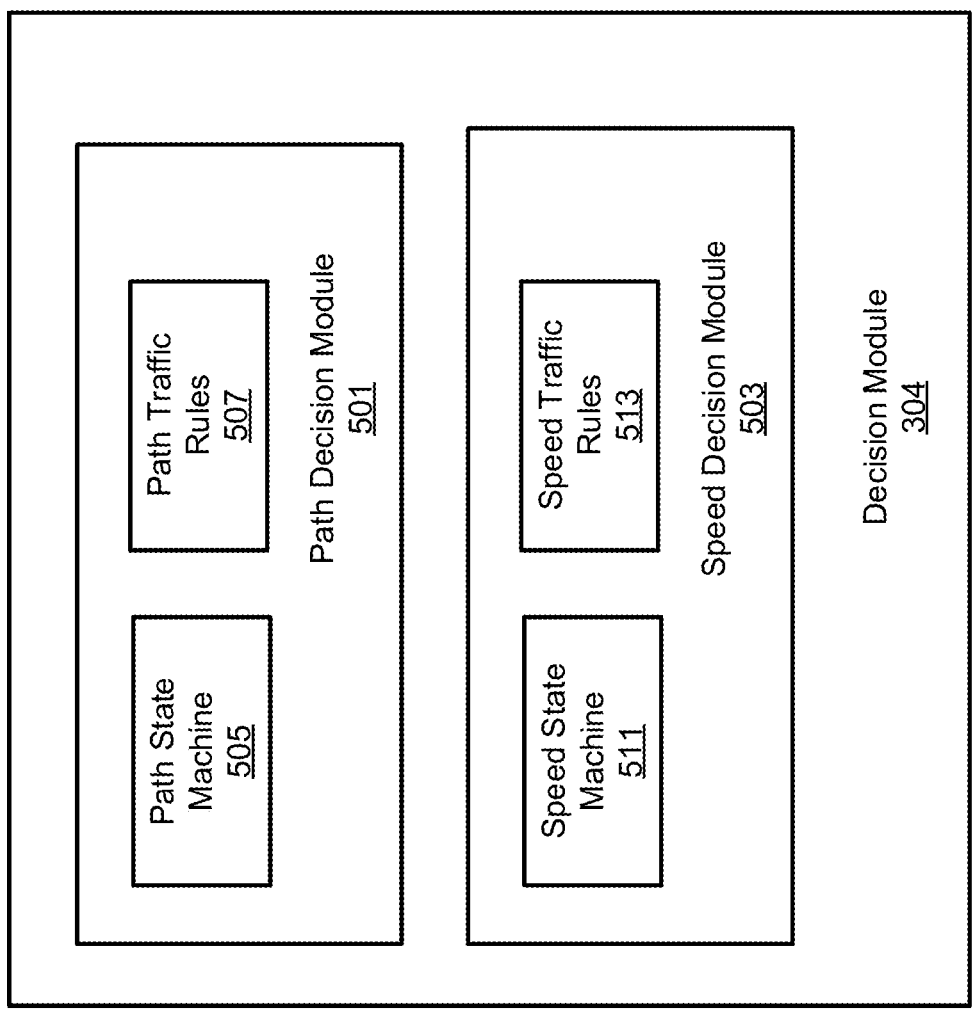
FIG. 5 is a block diagram illustrating an example of a decision module according to one embodiment.

FIG. 4 is a block diagram illustrating an example of a decision and planning process according to one embodiment. FIG. 5A is a block diagram illustrating an example of a decision module 304 according to one embodiment. Referring to FIG. 4, decision and planning process 400 includes routing module 307, localization/perception data 401, path decision process 403, speed decision process 405, path planning process 407, speed planning process 409, and trajectory calculator 413.

Path decision process 403 and speed decision process 405 may be performed respectively by a path decision module 501 and a speed decision module 503 of decision module 304 in FIG. 5A. Referring to FIG. 4 and FIG. 5A, path decision process 403 or path decision module 501 includes path state machine 505, and path traffic rules 507. Path decision process 403 or path decision module 501 can generate a rough path profile as an initial constraint for the path/speed planning processes 407 and 409 using dynamic programming. In one embodiment, path state machine 505 includes at least three states: cruising, changing lane, and idle states. Path state machine 505 provides previous planning results and important information such as whether the ADV is cruising or changing lanes. Path traffic rules 507, as part of driving/traffic rules 312 of FIG. 3A, include traffic rules that can affect the outcome of a path decisions module. For example, path traffic rules 507 can include traffic information such as construction traffic signs thereby the ADV can avoid lanes with such construction signs. From the states provided by the path state machine 504, traffic rules, reference line provided by routing module 307, and obstacles perceived by the ADV, path decision process 403 can decide how the perceived obstacles are handled (i.e., ignore, overtake, yield, stop, pass), as part of a rough path profile.

For example, in one embodiment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. Dynamic programming (or dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision process 405 or speed decision module 503 includes speed state machine 511, and speed traffic rules 513. Speed decision process 405 or speed decision module 503 can generate a rough speed profile as an initial constraint for the path/speed planning processes 407 and 409 using dynamic programming. In one embodiment, speed state machine 511 includes at least two states: speed up and slow down states. Speed traffic rules 513, as part of driving/traffic rules 312 of FIG. 3A, include traffic rules that can affect the outcome of a speed decisions module. For example, speed traffic rules 513 can include traffic information such as red/green traffic lights, another vehicle in a crossing route, etc. From a state of the speed state machine, speed traffic rules, rough path profile generated by decision process 403, and perceived obstacles, speed decision process 405 can generate a rough speed profile to control when to speed up and/or slow down the ADV.

Referring to FIG. 4, path planning process 407 can use a rough path profile as the initial constraint to recalculate an optimal reference line using quadratic programming. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once. Path planning process 407 can recalculate a reference line with a path cost function, as part of cost functions 315 of FIG. 3A, to optimize a total cost for candidate movements for reference points, for example, using QP optimization performed.

Speed planning process 409 can use a rough speed profile and results from path planning process 407 as initial constraints to calculate an optimal station-time curve as part of cost functions 315 of FIG. 3A, to optimize a total cost for movement candidates (e.g., speed up/slow down) at different points in time. Trajectory generator 413 can calculate the final trajectory to control the ADV. For example, trajectory generator 413 may calculate a list of (x, y, T) points indicating at what time should the ADC pass a particular (x, y) coordinate.

Thus, path decision process 403 and speed decision process 405 are used to generate a rough path profile and a rough speed profile taking into consideration obstacles and/or traffic conditions. Given all the path and speed decisions regarding the obstacles, path planning process 407 and speed planning process 409 are to optimize the rough path profile and the speed profile in view of the obstacles using QP programming to generate an optimal trajectory with minimum path cost and/or speed cost.

Figure 6:
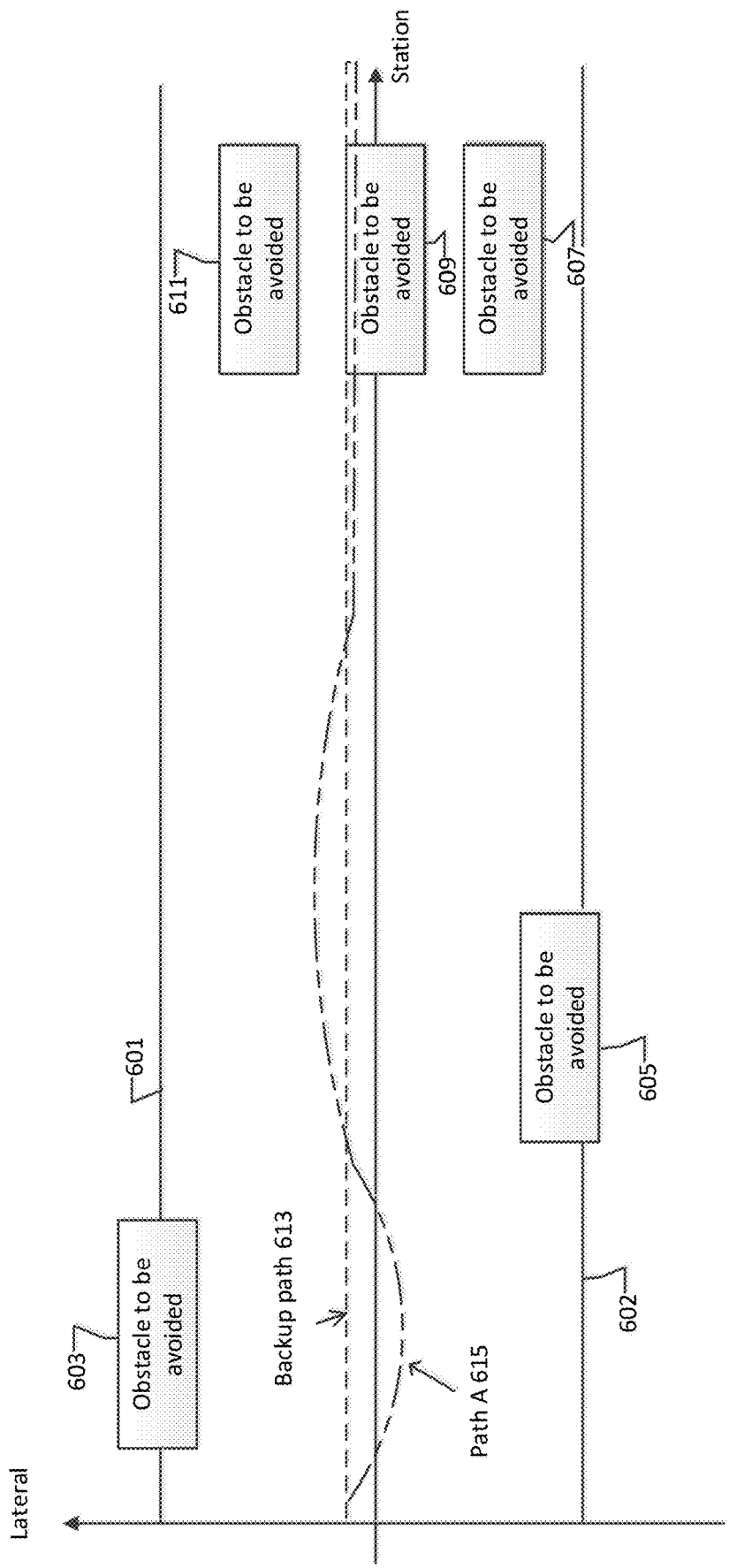
FIG. 6 is a diagram illustrating a scene for path planning according to one embodiment.

FIG. 6 is a diagram illustrating a scene for path planning according to one embodiment. The scene is represented in a station-lateral coordinate in which the origin represents the current position of a vehicle with the x-axis representing the forward distance and the y-axis representing the lateral distance from the current position of the vehicle. First and second boundary lines 601 and 602 may represent the boundaries of a road or the boundaries of a lane. The scene depicted in FIG. 6 shows a first obstacle 603 at a positive lateral distance near the first boundary line 601 at some distance forward from the vehicle. A second obstacle 605 is at a negative lateral distance near the second boundary line 602 at a distance forward from the first obstacle 603. Three additional obstacles 607, 609, and 611 are further out in the forward direction. The obstacles may be objects, vehicles, pedestrians, barriers, or other obstructions to be avoided by the vehicle. An obstacle may be surrounded by a zone larger than the physical size of the obstacle where the zone is also to be avoided by the vehicle.

As discussed, a path decision process may generate a reference line for the vehicle based on a cost function that takes into account a curvature of the road, distances of the reference line to obstacles, etc. In one embodiment, a reference line may be the middle of the road or the middle of a lane. A path planning process may optimize the reference line to find a path trajectory with the lowest cost based on the path cost function from among a plurality of candidate trajectories. The path trajectory thus generated may deviate from the reference line at some sections to maneuver the vehicle around obstacles. The path planning process may plan a path for the vehicle along a path length that is some forward distance from the current position of the vehicle. In one embodiment, the path length may be 150-200 meters. In one embodiment, the path length may be a function of the current speed of the vehicle so that the path length increases for a higher speed vehicle.

In FIG. 6, the path length may be longer than the distance of the obstacles 607, 609, and 611 from the vehicle. When the path planning process plans a path for the path length, it may detect that while path A (615) allows the vehicle to maneuver around the near-by obstacles 603 and 605, the long-distance obstacles 607, 609, and 611 block the vehicle from continuing on the road or lane. Because, the path planning process could not successfully find a path (i.e., path that satisfies the constraint imposed by the cost function of staying within the boundaries of the road without colliding with or otherwise come within a safe distance of obstacles), the path planning process may default to a backup path 613. The backup path 613 may be a path along the middle of the road or lane. In one embodiment, the backup path 613 may be the reference line of the path decision process 403. However, the backup path 613 may cross the obstacle 603 or the zone around the obstacle 603. As a result, the vehicle may stop before the obstacle 603, rather than traveling along the path A (615) to maneuver around the obstacles 603 and 605 until it is blocked from continuing by the obstacles 607, 609, and 611.

Figure 7:
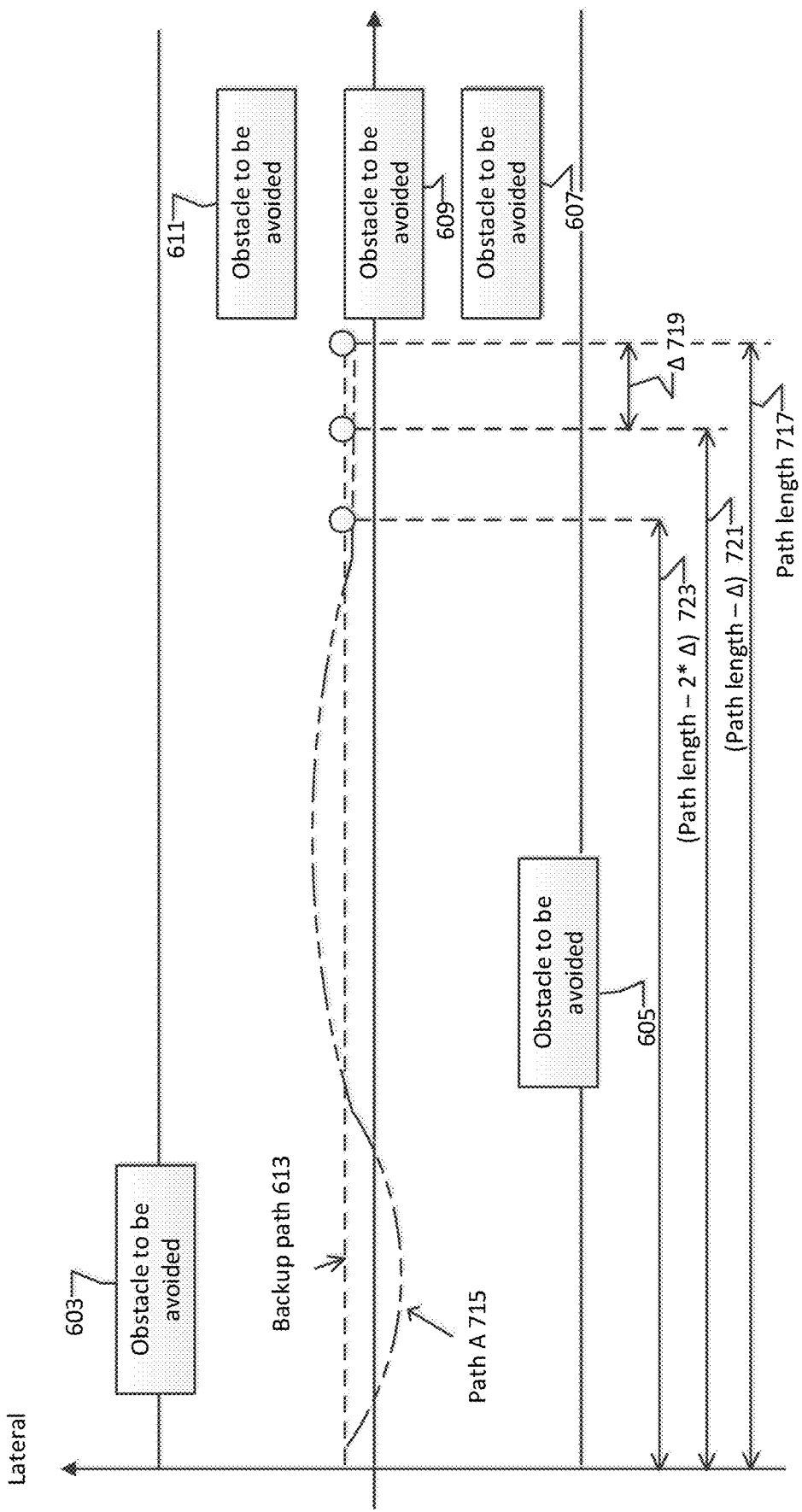
FIG. 7 is a diagram illustrating a path trajectory determined by a path planning operation in a scene according to one embodiment.

FIG. 7 is a diagram illustrating a path trajectory determined by a path planning operation in a scene according to one embodiment. The scene in FIG. 7 is the same as the one in FIG. 6. The path planning process may start with a default path length 717. In one embodiment, the default path length 717 may be a function of the current speed of the vehicle with a minimum length. For example, the default path length 717 may be a distance of (8 sec*current speed+30 m). If the path planning process successfully generates a path that satisfies the constraints of the path planning process and that enables the vehicle to travel the distance of the default path length 717, the path may be passed to the speed planning process to determine the speed for the vehicle along the path. If, on the other hand, the path planning process fails to generate a path, the path planning process may determine a reason for the failure. Reasons for path planning failure may include no feasible path exists due to blocking due to obstacles, failure to curve-fit any candidate path to the road or lane that satisfies the constraints of the path planning process, the cost of all curve-fitted candidate paths calculated by the cost function exceed a maximum cost, etc. For example, because the default path length 717 projected forward from the current position of the vehicle is blocked by the long-distance obstacles 607, 609, and 611, the path planning process may fail to generate a path due to the blocking obstacles.

If the reason for the path planning failure is blocking obstacles, the path planning process may reduce the path length by a decrement. The path planning process may perform path planning using the decremented path length 721 to see if the long-distance obstacles 607, 609, 611 may be ignored. In one embodiment, the decrement may be 10 meters. The path planning process may successfully generate a path based on the decremented path length 721 if, for example, the decremented path length 721 projected forward from the current position of the vehicle no longer crosses the long-distance obstacles 607, 609, 611 or the zones around these obstacles. Because there are no blocking obstacles that would cause the path to default to the backup path 613, the path planning process may generate a path 715 that maneuvers the vehicle around the near-by non-blocking obstacles 603 and 605. The path 715 may be the lowest cost path because the path initially curves in the negative lateral direction to increase the distance from obstacle 603, curves in the positive lateral direction after it passes obstacle 603 to increase the distance from obstacle 605, and settles toward the backup path 613 after it passes obstacle 605 to minimize the cost function.

Because the path generated using the decremented path length 721 is shorter, the speed planning process may put a constraint to stop the vehicle at the end of the path. By generating the path 715 using a path length shorter than the default path length 717, the path planning process successfully generates the path 715 that allows the vehicle to navigate past the obstacles 603 and 605 to come to a stop before the obstacles 607, 609, and 611.

If the path planning process does not successfully generate a path based on the decremented path length 721, the path planning process may determine the reason for the failure. If the reason is again blocking obstacles, the path planning process may decrement the path length by yet another decrement to generate the decremented path length 723. The path planning process may perform the path planning using the decremented path length 723. The path planning process may iteratively decrement the path length and perform path planning using the decremented path length until a path is successfully generated, the path planning fails due to reasons other than blocking obstacles, or until the path length is decremented below a minimum path length. In one embodiment, the minimum path length is 20 meters. In the case that the path planning fails due to reason other than blocking obstacles, or the path length is decremented below the minimum path length, the path may default to the backup path 613. Speed planning may be performed using the backup path 613.

Figure 8:
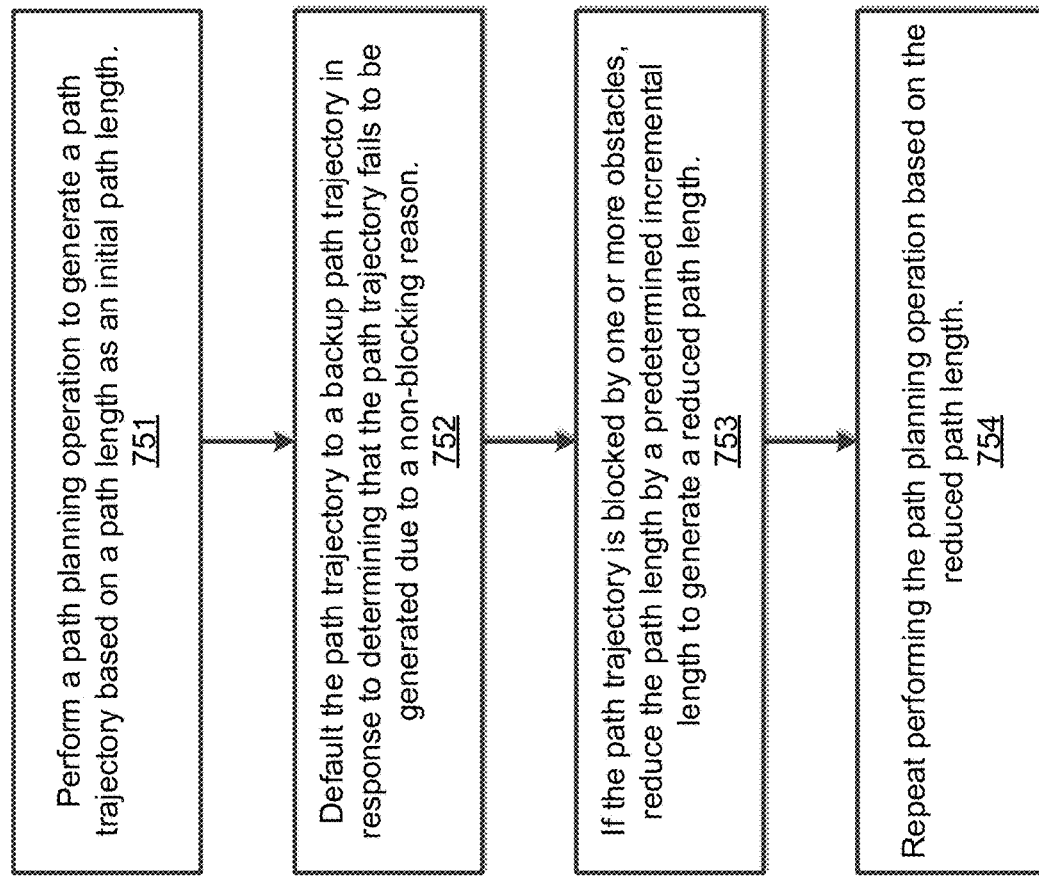
FIG. 8 is a flow diagram illustrating a method of path planning according to one embodiment

FIG. 8 is a flow diagram illustrating a method of path planning according to one embodiment. Method 750 may be performed by processing logic which may include software, hardware, or a combination thereof. Referring to FIG. 8, at block 751, processing logic performs a path planning operation to generate a path trajectory based on a path length as an initial path length. At block 752, processing logic defaults the path trajectory to a backup path trajectory, in response to determining that the path trajectory fails to be generated due to a non-blocking reason. At block 753, if the path trajectory is blocked by one or more obstacles, reduce the path length by a predetermined incremental length to generate a reduced path length. At block 754, processing logic repeats performing the path planning operation based on the reduced path length.

Figure 9:
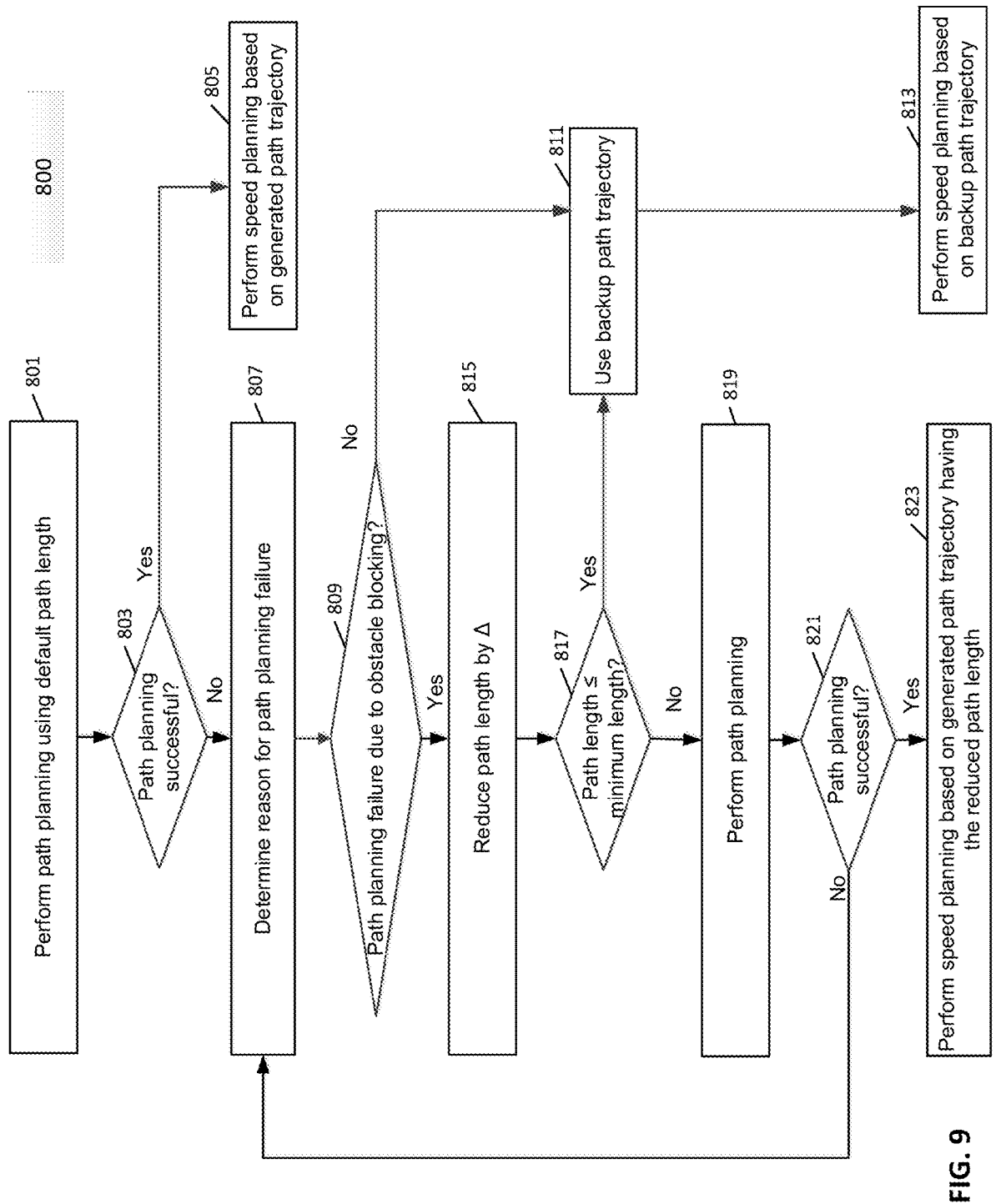
FIG. 9 is a flow diagram illustrating a method of path planning according to another embodiment.

FIG. 9 is a flow diagram illustrating a method of path planning according to another embodiment. The path planning method 800 may be performed by processing logic which may include software, hardware, or a combination thereof. For example, the path planning method 800 may be performed by the decision module 304, planning module 305, or the path decision module 501 of an autonomous driving vehicle. At block 801, the method 800 performs path planning using a default path length. At block 803, the method 800 determines if it successfully generates a path that satisfies the constraints and enables the vehicle to travel the distance of the default path length. If a path is successfully generated, at block 805, the method 800 performs speed planning based on the generated path.

At block 807, if a path fails to be generated, the method 800 determines a reason for the planning failure. Reasons for path planning failure may include no feasible path exists due to blocking due to obstacles, failure to curve-fit any candidate path to the road or lane that satisfies the constraints of the path planning process, the cost of all curve-fitted candidate paths calculated by the cost function exceed a maximum cost, etc.

At block 809, the method 800 determines if the reason for the planning failure is due to obstacle blocking. If the reason is not due to obstacle blocking, at block 811, the method 800 selects a backup path as the default path. The backup path may be a path along the middle of the road or lane. In one embodiment, the backup path may be the reference line of the path decision process 403. At block 813, the method 800 performs speed planning based on the backup path.

At block 815, if the reason for the planning failure is due to obstacle blocking, the method 800 reduces the path length by a decrement. At block 817, the method 800 determines if the decremented path length is less than or equal to a minimum length. If the decremented path length is less than the minimum length, the method selects the backup path as the default path 15 at block 811 and performs speed planning based on the backup path at block 813.

At 819, if the decremented path length is greater than the minimum length, the method 800 performs the path planning using the decremented path length. At block 821, the method 800 determines if it successfully generates a path using the decremented path length. If a path has been successfully generated, at block 823, the method performs speed planning based on the generated path to make sure the vehicle stops at the end of the shorter path.

If a path fails to be generated, the method repeats block 807 to determine a reason for the failure, reduces the path length once again by the decrement at block 815 if the failure is due to obstacle blocking, and perform the path planning at block 819 until a path is successfully generated, the path fails to be generated due to reason other than obstacle blocking, or the decremented path length is less than or equal to the minimum length.

Figure 10:
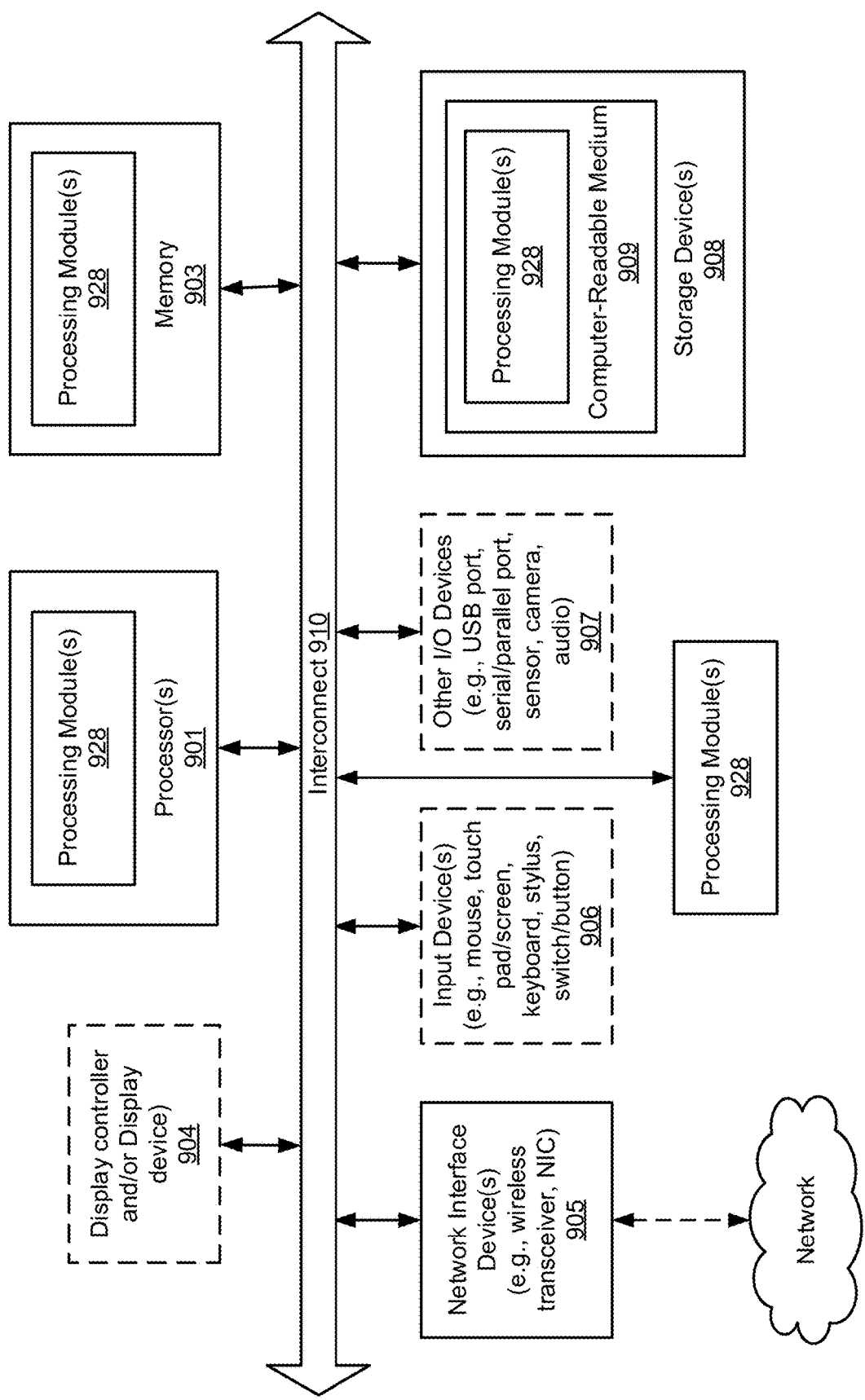
FIG. 10 is a block diagram illustrating a data processing system according to one embodiment.

FIG. 10 is a block diagram illustrating an example of a data processing system which may be used with one embodiment of the disclosure. For example, system 900 may represent any of data processing systems described above performing any of the processes or methods described above, such as, for example, perception and planning system 110 including decision module 304, planning module 305 of FIGS. 3A and 3B, path decision module 501 of FIG. 5A, or any of servers 103-104 of FIG. 1. System 900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 900 is intended to show a high level view of many components of the computer system. However, it is to be understood that additional components may be present in certain implementations and furthermore, different arrangement of the components shown may occur in other implementations. System 900 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 900 includes processor 901, memory 903, and devices 905-908 connected via a bus or an interconnect 910. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 901, which may be a low power multi-core processor socket such as an ultra-low voltage processor, may act as a main processing unit and central hub for communication with the various components of the system. Such processor can be implemented as a system on chip (SoC).

Processor 901 is configured to execute instructions for performing the operations and steps discussed herein. System 900 may further include a graphics interface that communicates with optional graphics subsystem 904, which may include a display controller, a graphics processor, and/or a display device.

Processor 901 may communicate with memory 903, which in one embodiment can be implemented via multiple memory devices to provide for a given amount of system memory. Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Robot Operating System (ROS), Windows® operating system from Microsoft®, Mac OS/iOS from Apple, Android® from Google®, LINUX, UNIX, or other real-time or embedded operating systems.

System 900 may further include 10 devices such as devices 905-908, including network interface device(s) 905, optional input device(s) 906, and other optional IO device(s) 907. Network interface device 905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 907 may include an audio device. An audio device may include a speaker and/or a microphone to facilitate voice-enabled functions, such as voice recognition, voice replication, digital recording, and/or telephony functions. Other IO devices 907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 910 via a sensor hub (not shown), while other devices such as a keyboard or thermal sensor may be controlled by an embedded controller (not shown), dependent upon the specific configuration or design of system 900.

To provide for persistent storage of information such as data, applications, one or more operating systems and so forth, a mass storage (not shown) may also couple to processor 901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 901, e.g., via a serial peripheral interface (SPI). This flash device may provide for non-volatile storage of system software, including BIOS as well as other firmware of the system.

Storage device 908 may include computer-accessible storage medium 909 (also known as a machine-readable storage medium or a computer-readable medium) on which is stored one or more sets of instructions or software (e.g., module, unit, and/or logic 928) embodying any one or more of the methodologies or functions described herein. Processing module/unit/logic 928 may represent any of the components described above, such as, for example, decision module 304, or planning module 305 of FIGS. 3A and 3B, or path decision module 501 of FIG. 5A. Processing module/unit/logic 928 may also reside, completely or at least partially, within memory 903 and/or within processor 901 during execution thereof by data processing system 900, memory 903 and processor 901 also constituting machine-accessible storage media. Processing module/unit/logic 928 may further be transmitted or received over a network via network interface device 905.

Computer-readable storage medium 909 may also be used to store the some software functionalities described above persistently. While computer-readable storage medium 909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 928, components and other features described herein can be implemented as discrete hardware components or integrated in the functionality of hardware components such as ASICS, FPGAs, DSPs or similar devices. In addition, processing module/unit/logic 928 can be implemented as firmware or functional circuitry within hardware devices. Further, processing module/unit/logic 928 can be implemented in any combination hardware devices and software components.

Note that while system 900 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
performing a path planning operation to generate a path trajectory based on a path length as an initial path length;
defaulting the path trajectory to a backup path trajectory in response to determining that the path trajectory fails to be generated due to a non-blocking reason; and
in response to determining that the path trajectory is blocked by one or more obstacles,
reducing the path length by a predetermined incremental length to generate a reduced path length, and
repeatedly performing the path planning operation based on the reduced path length.

2. The method of claim 1, further comprising iteratively performing reducing the path length by a predetermined incremental length and repeatedly performing the path planning operation until a predetermined condition has been satisfied.

3. The method of claim 2, wherein the predetermined condition is satisfied when the path trajectory is generated successfully, the path trajectory fails to be generated due to a non-blocking reason, or the reduced path length is less than a predetermined minimum length.

4. The method of claim 2, further comprising:
defaulting the path trajectory to the backup path trajectory in response to determining that the path trajectory based on the reduced path length fails to be generated due to the non-blocking reason or the reduced path length is less than a predetermined minimum length; and
performing a speed planning to generate a speed profile for the ADV based on the backup path trajectory.

5. The method of claim 1, further comprising performing a speed planning to generate a speed profile to stop the ADV at an end of the path trajectory if the path planning generates the path trajectory based on the reduced path length.

6. The method of claim 5, further comprising controlling the ADV autonomously according to the path trajectory and the speed profile.

7. The method of claim 1, wherein the non-blocking reason that causes the failure comprises none of a plurality of candidate curves of the path trajectory satisfying a path constraint of the path trajectory.

8. The method of claim 1, wherein the initial path length is determined based on a current speed of the ADV.

9. A non-transitory machine-readable medium having instructions stored therein, which when executed by a processor, cause the processor to perform operations, the operations comprising:
performing a path planning operation to generate a path trajectory based on a path length as an initial path length;
defaulting the path trajectory to a backup path trajectory in response to determining that the path trajectory fails to be generated due to a non-blocking reason; and
in response to determining that the path trajectory is blocked by one or more obstacles,
reducing the path length by a predetermined incremental length to generate a reduced path length, and
repeatedly performing the path planning operation based on the reduced path length.

10. The machine-readable medium of claim 9, wherein the operations further comprise iteratively performing reducing the path length by a predetermined incremental length and repeatedly performing the path planning operation until a predetermined condition has been satisfied.

11. The machine-readable medium of claim 10, wherein the predetermined condition is satisfied when the path trajectory is generated successfully, the path trajectory fails to be generated due to a non-blocking reason, or the reduced path length is less than a predetermined minimum length.

12. The machine-readable medium of claim 10, wherein the operations further comprise:
   defaulting the path trajectory to the backup path trajectory in response to determining that the path trajectory based on the reduced path length fails to be generated due to the non-blocking reason or the reduced path length is less than a predetermined minimum length; and
   performing a speed planning to generate a speed profile for the ADV based on the backup path trajectory.

13. The machine-readable medium of claim 9, wherein the operations further comprise performing a speed planning to generate a speed profile to stop the ADV at an end of the path trajectory if the path planning generates the path trajectory based on the reduced path length.

14. The machine-readable medium of claim 13, wherein the operations further comprise controlling the ADV autonomously according to the path trajectory and the speed profile.

15. The machine-readable medium of claim 9, wherein the non-blocking reason that causes the failure comprises none of a plurality of candidate curves of the path trajectory satisfying a path constraint of the path trajectory.

16. The machine-readable medium of claim 9, wherein the initial path length is determined based on a current speed of the ADV.

17. A data processing system, comprising:
   a processor; and
   a memory coupled to the processor to store instructions, which when executed by the processor, cause the processor to perform operations, the operations including
   performing a path planning operation to generate a path trajectory based on a path length as an initial path length,
   defaulting the path trajectory to a backup path trajectory in response to determining that the path trajectory fails to be generated due to a non-blocking reason, and
   in response to determining that the path trajectory is blocked by one or more obstacles,
      reducing the path length by a predetermined incremental length to generate a reduced path length, and
      repeatedly performing the path planning operation based on the reduced path length.

18. The system of claim 17, wherein the operations further comprise iteratively performing reducing the path length by a predetermined incremental length and repeatedly performing the path planning operation until a predetermined condition has been satisfied.

19. The system of claim 18, wherein the predetermined condition is satisfied when the path trajectory is generated successfully, the path trajectory fails to be generated due to a non-blocking reason, or the reduced path length is less than a predetermined minimum length.

20. The system of claim 18, wherein the operations further comprise:
   defaulting the path trajectory to the backup path trajectory in response to determining that the path trajectory based on the reduced path length fails to be generated due to the non-blocking reason or the reduced path length is less than a predetermined minimum length; and
   performing a speed planning to generate a speed profile for the ADV based on the backup path trajectory.

* * * * *